United States Patent

[11] 3,617,619

[72] Inventors Rudolf Roither;
Ernst Schuhbauer; Hans Heinrich Voss, all of Munich, Germany
[21] Appl. No. 739,682
[22] Filed June 25, 1968
[45] Patented Nov. 2, 1971
[73] Assignee Siemens Aktiengesellschaft
Munich, Germany
[32] Priority July 20, 1967
[33] Germany
[31] P 15 37 336.1

[54] METHOD AND APPARATUS FOR THE TRANSMISSION OF BINARY CODED DATA WITH LOW LEVEL DIRECT CURRENT VOLTAGES
6 Claims, 1 Drawing Fig.

[52] U.S. Cl. .......... 178/4.1 R, 178/69 R
[51] Int. Cl. .......... H04l 17/00
[50] Field of Search .......... 179/15 BY, 16 A, 16 AA, 86, 84 SS, 84 R, 2.5 R, 2 DP, 18 HB; 178/4.1 R, 2 R, 74

[56] References Cited
UNITED STATES PATENTS

| | | | |
|---|---|---|---|
| 2,008,563 | 7/1935 | Sarbey | 179/16 (.09 A) |
| 2,837,605 | 6/1958 | Hochgraf et al. | 179/84 |
| 3,344,401 | 8/1967 | MacDonald et al. | 179/2 DP |
| 3,154,635 | 10/1964 | Paulding et al. | 178/4.1 |
| 2,507,191 | 5/1950 | Bayard et al. | 178/74 |

*Primary Examiner*—Kathleen H. Claffy
*Assistant Examiner*—Thomas W. Brown
*Attorney*—Birch, Swindler, McKie & Beckett

ABSTRACT: A method and apparatus to transmit control signals such as remote connection and disconnection signals, dialing signals, free signals, etc., the amplitudes of which rather than the time duration thereof, are evaluated. The leading and trailing edges of the control signals are leveled off, and the control signals are transmitted independently of the data transmission.

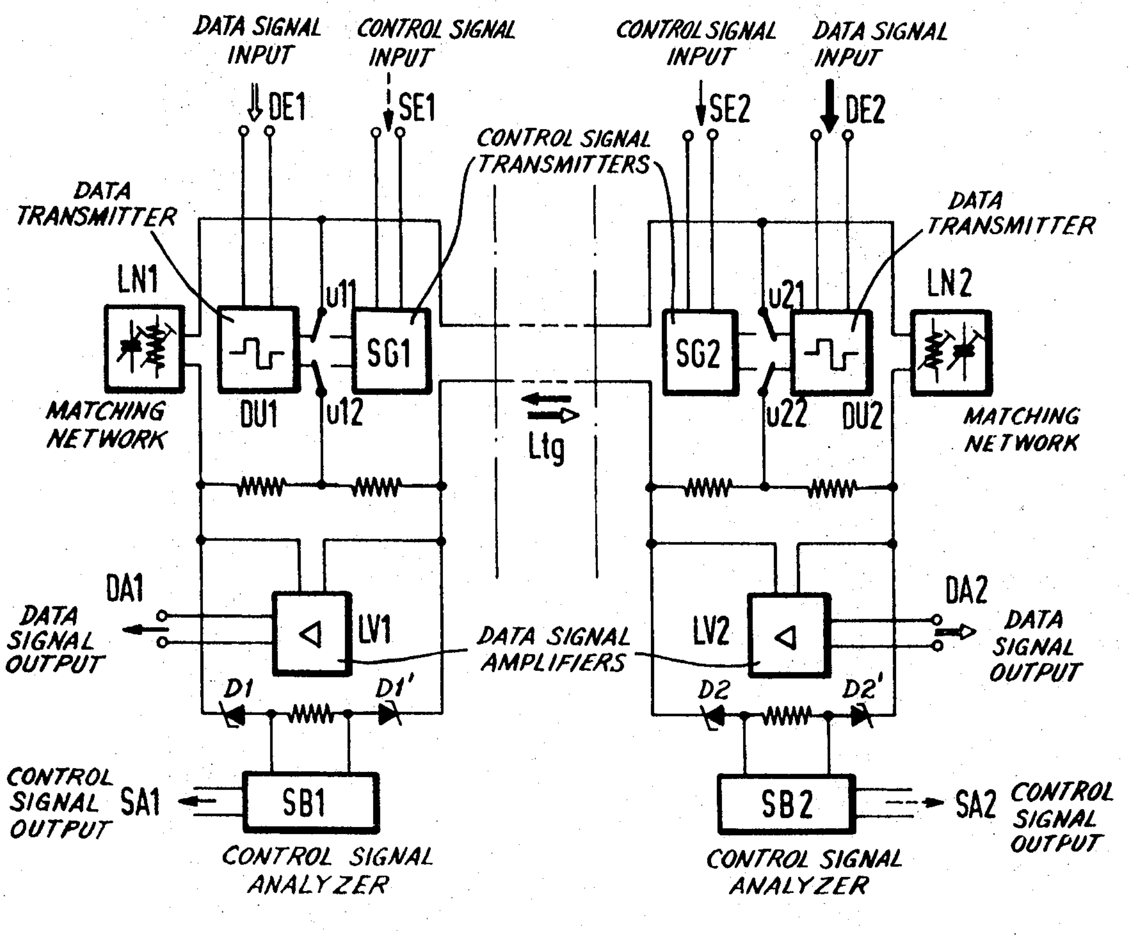
DATA SIGNAL INPUT
CONTROL SIGNAL INPUT
DE1
SE1
CONTROL SIGNAL INPUT
DATA SIGNAL INPUT
SE2
DE2
CONTROL SIGNAL TRANSMITTERS
DATA TRANSMITTER
DATA TRANSMITTER
LN1
u11
SG1
SG2
u21
LN2
DU1
u12
u22
DU2
MATCHING NETWORK
MATCHING NETWORK
Ltg
DA1
DATA SIGNAL OUTPUT
LV1
DATA SIGNAL AMPLIFIERS
LV2
DA2
DATA SIGNAL OUTPUT
D1
D1'
D2
D2'
CONTROL SIGNAL OUTPUT
SA1
SB1
SB2
SA2
CONTROL SIGNAL OUTPUT
CONTROL SIGNAL ANALYZER
CONTROL SIGNAL ANALYZER

METHOD AND APPARATUS FOR THE TRANSMISSION OF BINARY CODED DATA WITH LOW LEVEL DIRECT CURRENT VOLTAGES

BACKGROUND OF THE INVENTION

1. Field of the Invention

The invention relates to the data transmission art and particularly concerns a method and switching arrangement therefor to transmit control signals in long distance communication installations. The data is transmitted in the form of pulses, and the control signals used to effect desired functions are transmitted independent of the data pulses. The amplitudes of the control signals are evaluated to effect the desired functions thereof.

2. Description of the Prior Art

The prior art, for example, U.S. Pat. No. 3,413,413, teaches the use of methods and apparatus for data transmission by means of direct current pulses. The permissible transmission voltage for high step speeds in the order of 2,400 Bd is normally limited by regulatory agencies to about 1 volt to prevent crosstalk disturbances to adjacent conductors. The use of such low voltage levels is generally referred to as low-level direct current data transmission.

In such low-level direct current data transmission systems, the remote connection and disconnection of the data transmitter and receiver are effected by control signals having predetermined time duration to carry out their function. In this regard, other control signals required for connection establishment and disconnection also have predetermined time durations to indicate their function. This type of control signal, for example, is used in Telex systems. Thus, it is the time duration of such control signals, rather than their amplitudes, which are evaluated to indicate the function thereof and thereby effect the desired operation. For example, a signal of time duration of 20 msec. normally indicates a dial start signal and a signal of time duration of 300 msec. indicates a dial end signal. If the time duration of the signals is evaluated, their function can be determined and carried out.

However, it is disadvantageous to use such signals because they disturb the formation of transparent channels. A transparent channel is known in the art to be a channel which can transmit all message signals below a predetermined step speed without having to consider the step raster in each case.

SUMMARY OF THE INVENTION

These and other disadvantages of the prior art are solved by the present invention which relates to a method and an arrangement for carrying out the method that provides for the formation of transparent channels and simultaneously decreases crosstalk. The invention takes cognizance of the fact that crosstalk between adjacent conductors is chiefly due to the rapid change of the leading and trailing edges of signals, rather than the actual amplitude levels thereof.

Therefore according to the invention a higher control signal voltage amplitude is employed that is transmitted independently from the data transmission, for effecting desired operation of the system. The control signals comprise remote connection and disconnection signals, dial signals, free signals, etc. At the receiving end the amplitude levels of the control signals are evaluated to determine their particular functions. Therefore, the time duration of such signals need not be evaluated, contrary to prior art methods discussed above.

Since the higher amplitude voltages employed by the control signals (compared to the prior art) are not continually applied to the transmission line, and since such control signals do not change as often as the impulses comprising the data, the utilization of higher voltage amplitudes for the control signals produces a disturbing influence that is within the admissible limit. Further, the invention comprises the leveling off of the leading and trailing edges of the control signals applied to the transmission line to further reduce any disturbing influences that the higher voltage amplitude control signals may have on adjacent conductors. In this manner, crosstalk between adjacent conductors is almost completely eliminated.

BRIEF DESCRIPTION OF THE DRAWING

The drawing illustrates a preferred switching arrangement that may be used to practice the method according to the invention.

DETAILED DESCRIPTION OF THE INVENTION

The drawing shows similar stations 1 and 2, each of which can transmit and receive data connected over line Ltg. Data to be transmitted is applied to station 1 through data input DE1. Similarly, data to be transmitted is applied to station 2 over data input DE2. The data applied is fed to direct current data transmitter DU1 in the case of station 1, and to direct current data transmitter DU2 in the case of station 2. The direct current data transmitters may comprise electronic relays, for example, responsive to the application of data to their respective inputs. Assuming that contacts u11 and u12 of station 1 and contacts u21 and u22 of station 2 are in the positions shown, the data will be fed in the form of direct current signals to transmission line Ltg for application to the other data station.

Additionally, data stations 1 and 2 comprise signal inputs SE1 and SE2, respectively. Signals applied thereto are control signals to effect desired connections. For example, such signals can effect remote connection, remote disconnection, or can comprise dial start signals, dial impulses, call criterion, etc. Such control signals applied to signal inputs SE1 and SE2 are converted, respectively, into corresponding direct current signals having specific voltage amplitudes by signal transmitters SG1 and SG2. To perform this conversion any of a variety of well-known expedients may be used. For example, an electronic relay similar to that used in the data transmitters will suffice. Of course, it will be necessary to either select an appropriate relay or adjust same so that the described parameters for the control signals may be realized. These are, of course, matters well known to those skilled in the art. When such control signals are applied to signal inputs SE1 and SE2, contacts u11, u12, u21, and u22 are actuated to their alternate positions to thereby complete the connection between signal transmitters SG1 and SG2 and transmission line Ltg. Thereby, the control signals as converted by the signal transmitters are applied to the other data station by transmission line Ltg.

Signal transmitters SG1 and SG2 may further comprise switching devices which function to level off the leading and trailing edges of the converted control produced signals by the signal transmitters. When the leading and trailing edges of a rectangular wave are thus leveled off, the differential quotient thereof is small relative to that of a substantially vertical edge. This serves to decrease the possibility of disturbances to adjacent conductors because it considerably decreases crosstalk, thereby permitting the formation of transparent channels.

The control signals transmitted by one data station to the other data station over transmission line Ltg are applied by amplitude-selective conduction devices to special signal analyzers SB1 or SB2. In the example shown in the drawing, the amplitude-selective switching devices comprise Zener diodes D1 and D1′ in the case of data station 1 and Zener diodes D2 and D2′ in the case of data station 2. Thus, the Zener diodes switch to an on or conductive condition when confronted with signals of a predetermined amplitude or greater, to allow the control signals to pass therethrough. The special signal analyzers then function to reconvert the direct current control signals back to the original form of the control signals, the latter being applied by data stations 1 and 2 to control signal outputs SA1 and SA2.

Data signals transmitted by one of the data stations to the other are applied to outputs DA1 or DA2 via line amplifiers LV1 or LV2, respectively. Additionally, the data stations comprise line-balancing networks LN1 or LN2, which duplicate the phase and resistance characteristics of the corresponding subscriber line.

It is within the concept of this invention that various types of switching devices such as flip-flop devices or any other kind of device capable of evaluating the voltage amplitude of received control signals may be utilized as signal analyzers SB1 and SB2. For example, one such bistable device may be utilized for each control level expected. As is well known, such devices will switch when confronted with a predetermined threshold voltage, and when that voltage disappears, they will switch back. Thus, when such a bistable device is switched upon the appearance of a control signal level, the desired control voltage can be coupled therefrom as needed. Further, the invention although described in relation to a duplex transmission system obviously can be applied to simplex, semisimplex or four-wire, full-duplex systems. The Zener diodes D1, D1', D2, and D2' can also be deleted and other switching devices having threshold values can be substituted therefor to function as voltage selective switching devices within the scope of the invention.

The invention therefore encompasses a method and switching arrangement for signaling in a data transmission system with direct current control signals, the amplitudes of which are evaluated to determine their respective functions, and at the same time provides for the formation of transparent channels.

Therefore the invention comprises a method of transmitting the control signals within an amplitude range that is higher than the permissible amplitude range in which the data signals are transmitted. Further, the receiving end of the transmission system evaluates the amplitude of received control signals to effect the desired operation of the transmission system thereby. The control signals are thus transmitted independently of the data signals, and as described above, provide for the formation of transparent channels without resulting cross-talk among adjacent conductors.

In telegraphy systems, for example, the invention provides for the transmission not only of the normal two signal states, that is, the permanent separation and permanent signal current conditions, but also provides within a predetermined voltage range for the transmission of signals indicating other conditions. These other conditions may be used to supervise individual connections or for other control signal purposes.

What is claimed is:

1. A method of transmitting control signals in a low-level, direct current data transmission system wherein data signals are limited to a predetermined amplitude, comprising the steps of:

transmitting control signals from a sending station to a receiving station at voltage amplitudes relatively greater than the highest voltage amplitude of said data signals, and analyzing said transmitted control signals in said receiving station to cause predetermined operations of said data transmission system to take place responsive, respectively, to predetermined voltage amplitudes of said control signals.

2. The method according to the claim 1 further comprising:

transmitting the control signals in the form or rectangular pulses, levelling off the leading and trailing edges of the control signals so that said edges assume a less vertical position before transmission thereof.

3. A transmission system for transmitting data signals in the form of low-level, direct current signals having a predetermined maximum amplitude, comprising:

at least a pair of stations connectable by a transmission line (Ltg) for transmitting and receiving signals therebetween, a direct current data transmitter (DU1, DU2 in each said station for transmitting data signals to said transmission line, amplifier means (LV1, LV2) in each said station for receiving and amplifying said data signals and coupling same to means external of said system, a control signal transmitter (SG1, SG2) in each said station for transmitting over said transmission line control signals having voltage amplitude levels relatively greater than said predetermined maximum amplitude of said data signals, voltage amplitude selection means in each said station having a threshold sensitivity level at a predetermined amplitude greater than said predetermined maximum amplitude for said data signals for selecting said control signals from the signals transmitted over said transmission line and for transmitting said control signals to a signal analyzer means, and signal analyzer means (SB1, SB2) in each said station for analyzing the amplitude levels of received control signals to effect predetermined operations of said data transmission system responsive to predetermined ones of said control voltage levels.

4. The transmission system recited in claim 2, further comprising:

switching means (u11, u12, u21, u22) to connect the control signal transmitters (SG1, SG2) to the transmission line only when control signals are being transmitted thereby, and to connect the signal analyzers (SB1, SB2) continuously to the transmission line.

5. The transmission system recited in the claim 4, wherein said selection means comprises:

voltage-selective conduction means (D1, D1', D2, D2') interposed between the transmission line and the signal analyzers (SB1, SB2) to permit conduction of voltage signals to said analyzers only when said conduction means are confronted with voltage signals of a predetermined amplitude or greater.

6. The transmission system recited in claim 5 wherein the voltage-selective conduction means comprise Zener diodes.

* * * * *